United States Patent [19]

Sugden, Jr.

[11] 3,724,808
[45] Apr. 3, 1973

[54] TWO STAGE FLOW CONTROL SYSTEM AND PILOT

[75] Inventor: Harry Sugden, Jr., Statesboro, Ga.

[73] Assignee: Emerson Electric Co., St. Louis, Mo.

[22] Filed: Jan. 10, 1972

[21] Appl. No.: 216,604

[52] U.S. Cl.................251/30, 222/20, F16K 31/12
[51] Int. Cl..............................................F16k 51/00
[58] Field of Search ....251/29, 30; 137/630, 16, 269; 222/20, 247, 518

[56] References Cited

UNITED STATES PATENTS

| 3,185,344 | 5/1965 | Kenney | 222/20 |
| 3,561,468 | 2/1971 | Sugden | 137/269 |

Primary Examiner—Henry T. Klinksiek
Attorney—J. Philip Polster

[57] ABSTRACT

A compound pilot of multiple function provides a greatly simplified two stage flow control valve and flow regulator.

15 Claims, 3 Drawing Figures

TWO STAGE FLOW CONTROL SYSTEM AND PILOT

BACKGROUND OF THE INVENTION

This invention relates to flow control systems, and in particular to a greatly simplified pilot for a two stage flow control system.

Two stage flow control systems provide delivery of a liquid at a relatively high flow rate until delivery of the liquid is nearly complete, and then reduces the flow to a much lower rate. Such systems are commonly employed to deliver large quantities of liquid from bulk storage at high flow rates. Examples include delivery of gasoline to tank trucks and aircraft fuel to airplanes. The two stage shut-off protects the delivery system against sudden pressure build-up (hydraulic shock) when the main valve of the system is closed and permits delivery of precisely predetermined quantities of liquid. Although such systems are presently used primarily to deliver predetermined quantities of liquid under the control of a flowmeter and set-stop, they may also be used in conjunction with other condition-sensing devices.

Various constructions of two stage flow controls have been known heretofore. Among the most successful of these have been systems utilizing a hydraulically controlled main valve and a pilot system for controlling movement of the valve. An example of such a system is shown in R.W. Kenney, U.S. Pat. No. 3,185,344. Such hydraulic pilot systems may utilize line pressure as the sole motive force needed to control the main valve and may in turn be electrically controlled, for instance by solenoids in the pilot systems. Therefore, the main valve and pilot may be positioned at any convenient spot in the flow line, the meter or other condition responsive device may be positioned at an entirely different location, and the counter or other set-stop may be located at yet another location, with the separate components connected merely by electrical lines.

The pilots of two-stage hydraulic control systems have heretofore been assemblies of single purpose pilot elements. These assemblies have been bulky, subject to leakage, difficult to assemble, and disassemble, and subject to mechanical damage.

SUMMARY OF THE INVENTION

One of the objects of this invention is to provide a single multiple function pilot for a two stage flow control system which will perform all of the functions of multiple pilot systems known heretofore.

Another object is to provide such a compound pilot which is rugged, compact, easily assembled and serviced, and less expensive than such pilots known heretofore.

Another object is to provide such a pilot which may readily be adapted to permit an uncontrolled high rate of flow, a controlled high rate of flow dependent on downstream line pressure, or a controlled high rate of flow dependent on a pressure differential.

Other objects will become apparent to those skilled in the art in light of the following specification and accompanying drawings.

In accordance with one aspect of this invention, generally stated, a compound pilot for a two stage flow control system is provided which includes a casting having first, second and third ports and having first and second chambers within the casting. The first port communicates with the first chamber and the second port communicates with the second chamber. A first passage in the casting between the first chamber and second chamber is opened and closed by a first remotely operable valve. A second passage in the casting connects the second chamber and the third port, and a second remotely operable valve opens and closes the end of the second passage which communicates with the second chamber. A third passage in the casting connects the first chamber and the second passage, and a pressure responsive pilot valve variably restricts the end of the third passage which communicates with the first chamber. The pilot valve preferably includes a control chamber defined in part by the casting. The control chamber may be connected by a first control passage to the third port and by a second control passage to a control port in the casting.

In accordance with another aspect of the invention, the first chamber and second chamber in the casting are connected by a first bore and the third port is connected to this bore through a second bore. Opposite ends of the bore are selectively opened and closed by the second remotely operable means and by the pilot valve means. Preferably a third bore intersects both the first bore and the second bore, with the first and second bores communicating with each other only through the third bore. A needle valve is threaded in the third bore and forms an adjustable restriction between the first bore and the second bore.

Preferably the pilot of this invention is connected to a conduit having a pressure responsive main valve between an inlet and an outlet, with the first and third ports of the pilot respectively connected to the inlet and outlet sides of the conduit and the second port connected to an expansible chamber controlling the main valve. A control circuit provides high flow under the control of the pilot valve by closing the first remotely operable valve and opening the second remotely operable valve. As the volume of liquid delivered through the main valve approaches the desired quantity, the control circuit opens the first remotely operable valve and closes the second to apply upstream pressure to the expansible chamber, thereby partially closing the main valve. The control circuit thereafter closes the first remotely operable valve while maintaining the second remotely operable valve closed to maintain a constant quantity of liquid in the expansible chamber, thereby maintaining a low flow rate until the total desired quantity of liquid has been delivered. The control circuit then opens the first remotely operable valve means while maintaining the second remotely operable valve means closed to apply upstream pressure to the expansible chamber, thereby closing the main valve. Preferably, the control circuit is electrical and includes electrical switches operated by a flowmeter and set-stop and a switch operated by movement of the main control valve to a preselected low flow position. Likewise, the first and second remotely operable valve means are preferably solenoid valves, the first being normally open and the second being normally closed.

BRIEF DESCRIPTION OF THE DRAWINGS

In the drawings,

3

Figure 1:
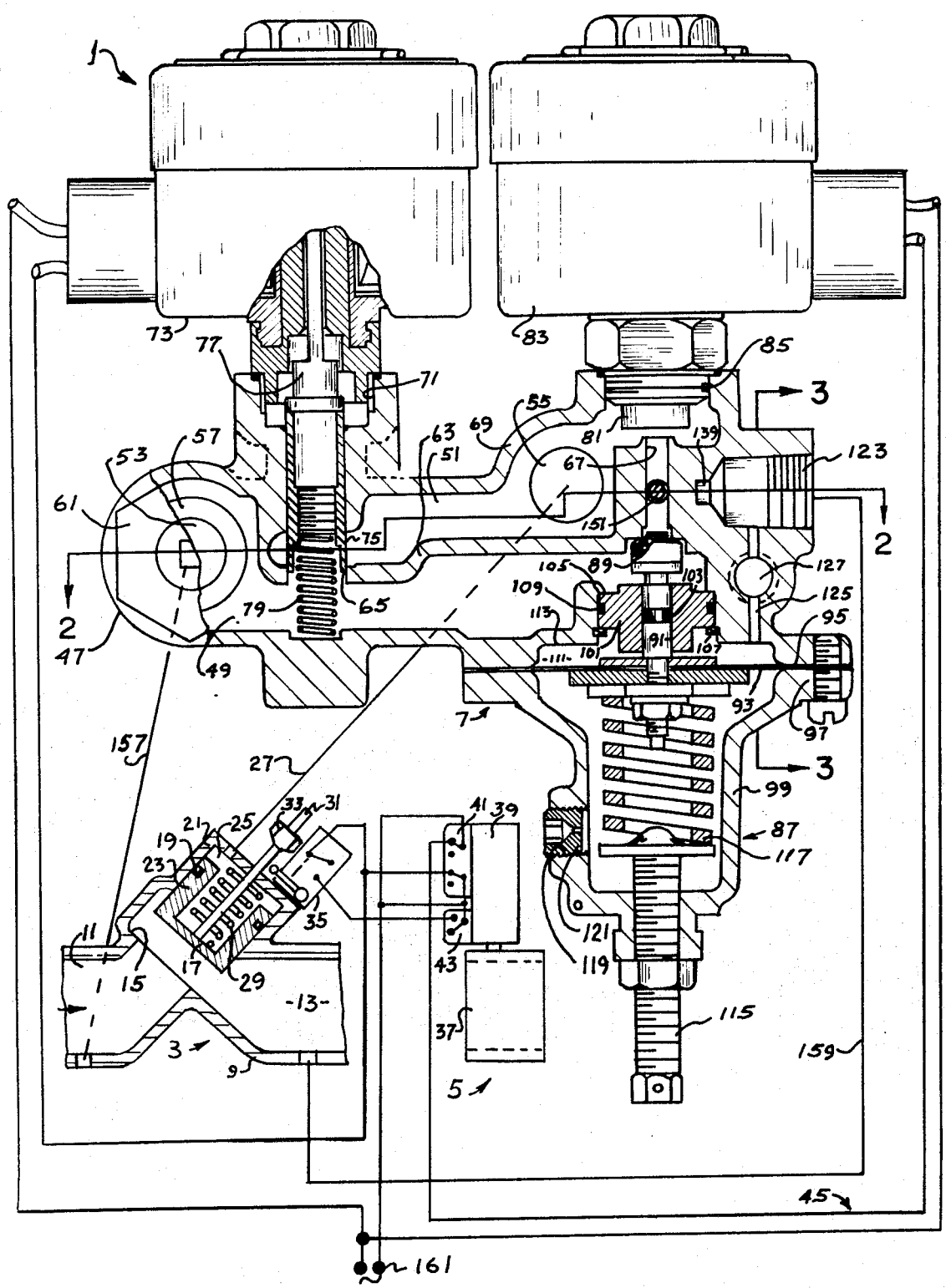
Figure 2:
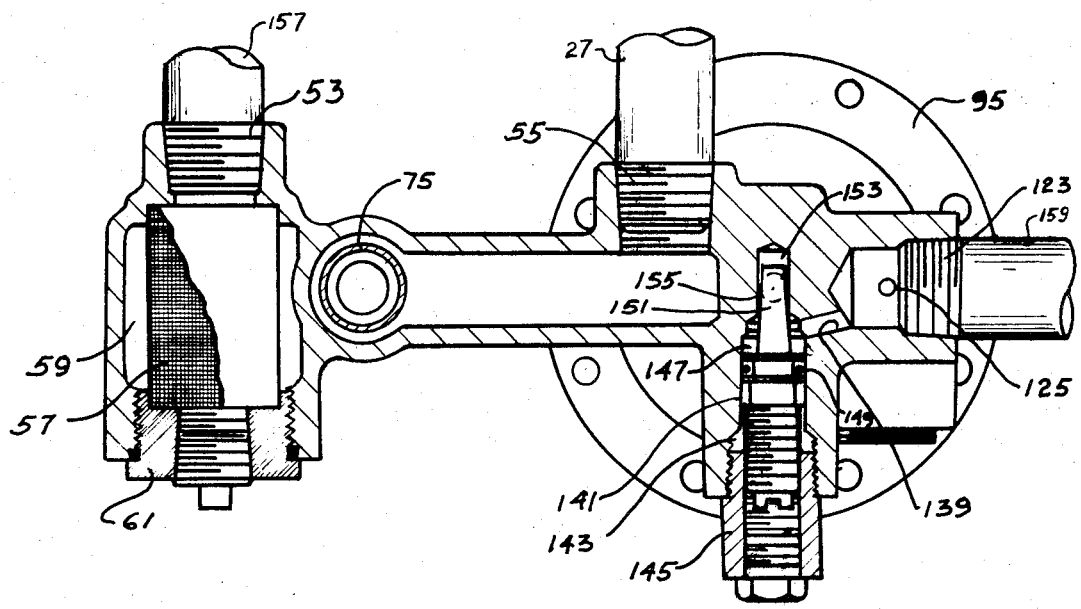

FIG. 1 is a partially diagrammatic view of the flow control system of this invention, with the main valve and pilot axially cut away;

FIG. 2 is a sectional view taken along the line 2—2 of FIG. 1; and

Figure 3:
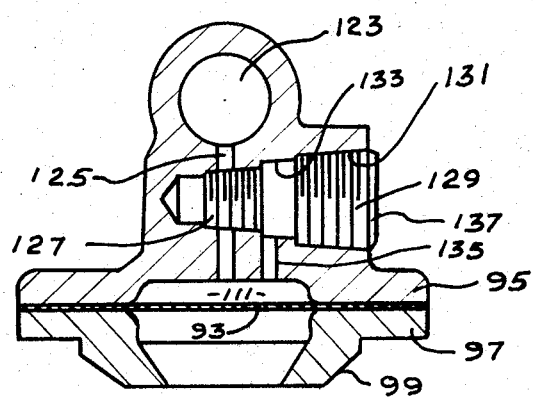

FIG. 3 is a sectional view taken along the line 3—3 of FIG. 1.

DESCRIPTION OF THE PREFERRED EMBODIMENT

Referring now to the drawings, reference numeral 1 indicates a two stage flow control system of this invention, including a main conduit and valve part 3, a meter and set-stop part 5, and a pilot 7. The conduit and main valve part 3 includes a conduit section 9 having an inlet side 11 and an outlet side 13 separated by a main valve seat 15. A pressure-responsive main valve 17 is slidably mounted in the conduit 9 to open and close the valve seat 15. The main valve part 17 is formed as a piston with an O-ring 19 forming a slidable seal between a cylinder wall 21 of the conduit and the side wall 23 of the valve 17. The expansible control chamber 25 defined by the cylinder wall 21 and the piston 17 communicates with a port of the pilot 7 through a line 27, as hereinafter discussed. A coil spring 29 biases the valve 17 into engagement with the valve seat 15. A stem 31 is carried by the piston 17 and extends through the upper wall of the chamber 25. A cam 33 is threaded onto the stem 31. A microswitch 35 mounted on the conduit 9 is actuated by the cam 33 to move the switch contact from a normally opened to a closed position as will hereinafter be described.

The flowmeter and set-stop 5 includes a flowmeter 37 arranged in the main flow line and a set stop 39 connected to the meter 37. The flowmeter 37 provides an output indication of volumetric flow and the set-stop 39 is a conventional register which is preset to a desired total volume and which compares the totalized output of the flowmeter 37 with this total volume to operate sequentially a double pole double throw microswitch 41 and a single pole double throw microswitch 43. Suitable mechanical and electronic digital registers are well known in the art, an example of a mechanical register being shown, for instance, in Batchelder et al., U.S. Pat. No. 2,818,198. The microswitches 41 and 43 are both of the normally open type, and with the microswitch 35, for part of a control circuit 45 as discussed hereinafter. The set-stop 39 is arranged to close the contacts of the microswitch 41 when some predetermined volume (such as 50 or 100 gallons) of liquid remains to be delivered, and to close the contact of the second microswitch 43 immediately before delivery is completed.

The hydraulically controlled valve 3 and the meter and set-stop 5 may be commercially available components such as those available from the Brooks Instrument Division, Emerson Electric Co. as "Quantrol" series 500 valves and "BiRotor" flowmeters equipped with "Quantrol" counters.

The pilot 7 includes a casting 47 having a first elongate chamber 49 and a second elongate chamber 51 within it. A first horizontal port 53 transversely intersects the rear wall of the first chamber 49 (as viewed in FIG. 1) and a second horizontal port 55 transversely intersects the rear wall of the second chamber 51. As shown particularly in FIG. 2, a filter element 57 is held in a transverse leg 59 of the first chamber 49 by a plug assembly 61 at the forward end of the leg 59. The first port 53, filter 57 and plug 61 are all coaxial. The first elongate chamber 49 and the second elongate chamber 51 are separated from each other by a wall 63 and communicate with each other through a first bore 65 and a second bore 67 through the wall 63. The first bore 65 also extends through the upper wall 69 of the casting 47 to a solenoid seat 71 in which is mounted a solenoid 73. A valve sleeve 75 carried by the plunger 77 of the solenoid 73 is snugly, but slidably, mounted in the bore 65. The travel of the solenoid plunger 77 moves the valve 75 from a normal (solenoid de-energized) upper position in which the first chamber 49 and second chamber 51 communicate substantially freely through the bore 65, to the lower, closed position shown in FIG. 1 in which the valve 75 closes the bore 65 through the wall 63. The valve 75 is biased upwardly to its open position by a spring 79, and the solenoid 73 is a two way "reverse-acting" solenoid which extends the plunger 77 a predetermined distance downward when energized.

The second bore 67 is parallel with the first bore 65 and is controlled at its upper end by a valve part 81 carried by the plunger of a two way solenoid 83. The solenoid 83 is a normally acting solenoid which retracts its plunger when activated, hence the valve 81 normally closes the upper end of the bore 67 and is moved to the open position shown in FIG. 1 when the solenoid 83 is activated. The solenoid 83 is threaded into a valve seat 85 in the upper wall 69 of the casting 47. The lower end of the bore 67 is controlled by a pilot valve 87. The pilot valve 87 includes a valve part 89 connected by a valve stem 91 to a diaphragm 93. The rim of the diaphragm 93 is secured between an annular rim 95 on the casting 47 and a rim portion 97 of a cup-shaped casting 99. The stem 91 is slidably mounted in a guide bushing 101 and is sealed against leakage by an O-ring 103 carried in an annular groove on the stem 91. The guide bushing 101 is held in a seat 105 in the casting 47 by a snap ring 107. The guide bushing 101 is sealed around its periphery by an O-ring 109 and forms part of a wall separating the first chamber 49 from a control chamber 111. The control chamber 111 is also defined in part by a wall 113 of the casting 47, by the rim 95 of the casting 47 and by the diaphragm 93.

The cup-shaped casting 99 includes a threaded bore at its closed end through which is threaded an adjustment screw 115. A coil spring 117 trapped between the diaphragm 93 and the adjustment screw 115 biases the diaphragm 93 upward, and hence biases the valve part 89 to close the lower end of the bore 67, as shown in FIG. 1. Of course, the adjustment of the screw 115 controls the compression of spring 117 and the force required to open valve 89. As will become apparent, the screw 115 thus controls the rate of flow through the main valve during the high flow period of a delivery cycle. A port 119 in the side wall of the cup-shaped casting 99 is threaded to receive either a pressure fitting or the vent plug 121 shown in FIG. 1.

The control chamber 111 communicates with a third port 123 in the pilot casting 47 through a control bore 125. The third port 123, like the first and second ports 53 and 55 is threaded to receive a fluid flow line. The third port 123, however, is perpendicular not only to the first bore 65 and second bore 67 but also the first port 53 and second port 55. The vertical bore 125 is intersected by the threaded inner section 127 of a fourth port 129. The fourth port 129 enters the forward face of the pilot casting 47 and is parallel with the first and second ports 53 and 55. An outer section 131 of the fourth port 129 is also threaded, and the sections 127 and 131 are connected by an intermediate section 133. The intermediate section 133 is connected to the control chamber 111 by another control bore 135. The control chamber may be selectively connected to the outlet port 123 by inserting a plug 137 in the outer section of the port 129, as shown in FIG. 3, or may alternatively be connected to some other pressure source by inserting a plug in the inner section 127 and connecting the external pressure source to the external section 131 of the port 129. The third port 123 is connected to the second passage 67 by a first connecting bore 139 and a second connecting bore 141. The second connecting bore 141 is parallel with the first, second and third ports 53, 55 and 123 and intersects the second bore 67 at its mid point. The second connecting bore 141 is essentially a three section port having its threaded outer section 143 closed by a needle valve support structure 145. The intermediate section 147 of the port 141 is sealed by an O-ring 149 carried by the needle valve 151. The inner section 153 of the bore 141 intersects the bore 67. The first connecting bore 139 connects the third port 123 with intermediate section 147 in the second connecting bore 141. Therefore, communication between the third port 123 and the second bore 67 is exclusively through a neck 155 (at the intersection of the inner and intermediate sections of the bore 141) which is selectively restricted by the needle valve 151. As will become apparent, the needle valve setting controls the sensitivity and opening speed of the main flow control valve 17.

The pilot 7 is connected to the conduit 9 by three short lengths of tubing. The section of tubing 27 connects the second port 55 to the control chamber 25 of the main valve 17, as already described. Another section of tubing 157 connects the inlet side 11 of the conduit 9 to the first port 53 of the pilot 7 and a third section of tubing 159 connects the outlet side 13 of the conduit 9 to the third port 123 of the pilot 7. When, as illustrated in the drawings, the pilot 47 is controlled by downstream pressure in the main flow conduit 9, these three connections are the only external connections required for the pilot 7 of this invention.

The electrical control circuit 45 includes a source of alternating current 161. The first solenoid 73 is connected across the source 161 through two parallel paths: (a) through one terminal side of the double pole double throw (high flow) switch 41 on the register 39 and (b) in series through the valve position switch 35 and the register single pole throw (low flow) switch 43. The second solenoid 83 is connected across the power source 161 through the other terminal of the double pole double throw (high flow) switch 41.

The operation of the control system 1 of this invention provides the desired two stage flow control as follows.

When the system is de-energized (i.e. the switches are all in their normal open positions) the valve 75 is open and the valve 81 is closed. Therefore, upstream line pressure is applied to the expansible control chamber 25 through line 157, bore 65 in the pilot 7, and line 27. The upstream pressure and the spring 29 in the main valve control chamber 25 hold the main valve 17 closed against the upstream pressure tending to open the valve 17.

When the register 39 is set to a desired volume delivery and the system is energized, the system assures the configuration shown in FIG. 1. The register 39 closes the contacts of the high flow switch 41 and both solenoids 73 and 93 are energized. Upstream pressure through the first bore 65 is cut off by the valve 75 and the control chamber 25 drains through the second bore 67, connecting bores 139 and 141, and line 159 to the outlet side of the conduit 9. Upstream pressure in the conduit 9 thereupon opens the main valve 17. It will be seen that the degree of restriction imposed by the needle valve 151 determines the rate of opening of the main valve 17. Because of the lack of initial pressure on the downstream side of the main valve 17, the pilot valve spring 117 maintains the pilot valve 87 closed. When downstream pressure in the control chamber 111 exceeds the force exerted by spring 117, the pilot valve part 89 is drawn by the diaphragm 93 away from the lower end of the bore 67, thereby applying upstream pressure through the bore 67 to the main control chamber 25 and reducing flow through the main conduit 9. It will be seen that although the position of the needle valve 151 controls the response rate or sensitivity of the main valve to changes in flow rate (by controlling leakage of liquid through the connecting passage 141 to the downstream side of the conduit, hence controlling the rate of pressure build-up in the control chamber 25), the maximum flow rate maintained by the control system is determined exclusively by the position of the pilot valve adjustment screw 115.

When resistance to flow downstream of the main control valve 17 is not constant, it is desirable to apply differential pressures to the opposite sides of the diaphragm 93, for example pressures taken from opposite sides of an orifice plate in the conduit 9. As described hereinbefore, insertion of a plug into the inner section 127 of the fourth port 129 and removal of the breather plug 121 in the port 119 permits the attachment of flow lines to these ports. The operation of the pilot valve 87 is identical in this configuration.

When only a preselected quantity of liquid remains to be delivered (for example, fifty gallons) the register 39 opens the high flow switch 41 and closes the low flow switch 43. Both solenoids 73 and 83 are thereby deenergized, and upstream pressure is again applied through the bore 65 to the main valve control chamber 25. As the main valve 17 closes to a predetermined position, the cam 33 closes the valve switch 35, thereby completing the circuit (b) to energize the first solenoid 73. Closure of the first bore 65 in the pilot 7 traps the liquid in the second chamber 51, line 27 and control chamber 25 and holds the main valve 17 in the low flow position set by the position of the cam 33. Immediately before the entire preselected quantity of liquid is delivered, the register 39 releases the low flow switch 43, thereby de-energizing the first solenoid 73 and permitting upstream pressure through the bore 65 to close the main valve 17.

Numerous variations within the scope of the appended claims will become apparent to those skilled in the art in light of the foregoing description. For example, if the set-stop 39, rather than being a mechanical register which trips associated microswitches, is an electronic digital controller which operates internal electronic switches, the set-stop 39 may be located at a location remote from the meter, for example at a central control point. Other pressure sensitive main valves may be used. Although the illustrative liquid pilot circuit and main valve position-responsive electrical switch 35 offer many advantages and are preferred, the pilot of this invention, as set out in the appended claims, may be used in other multiple stage flow control systems. These variations are merely illustrative.

Having thus described the invention, what is claimed and desired to be secured by Letters Patent is:

1. A flow control system for delivering fluid at a predetermined high flow rate, then automatically reducing the flow to a lower flow rate, and then cutting off flow altogether, comprising a conduit for carrying said fluid, said conduit having a valve seat opening between inlet and outlet sides of said conduit, main valve means cooperative with said valve seat opening for controlling flow through said conduit; expansible chamber means for actuating said main valve means; pilot means for controlling said expansible chamber means, said pilot means comprising a casting having a first port connected to said conduit inlet side, a second port connected to said expansible chamber means and a third port connected to said conduit outlet side, a first chamber and a second chamber in said casting, said first port communicating with said first chamber, and said second port communicating with said second chamber, first passage means in said casting between said first chamber and said second chamber, first remotely operable valve means for selectively opening and closing said first passage means, second passage means in said casting between said second chamber and said third port, second remotely operable valve means for selectively opening and closing the end of said second passage means communicating with said second chamber, third passage means in said casting between said first chamber and said second passage means, pilot valve means for variably restricting the end of said third passage means communicating with said first chamber, said pilot valve means comprising a valve member associated with said first chamber end of said third passage means and a pressure responsive element connected to actuate said valve member, and restriction means in said pilot means for restricting communication between said third passage means and said outlet side of said conduit; and control circuit means for closing said first remotely operable valve means and opening said second remotely operable valve means to apply to said expansible chamber means a pressure dependent on the position of said pilot valve means, thereafter opening said first remotely operable valve means and closing said second remotely operable valve means to apply upstream pressure to said expansible chamber means thereby partially closing said main valve means, thereafter closing said first remotely operable valve means while maintaining said second remotely operable valve means closed to maintain a constant quantity of fluid in said expansible chamber means thereby maintaining said main valve in a partially closed position, and thereafter opening said first remotely operable valve means while maintaining said second remotely operable valve means closed to apply upstream pressure to said expansible chamber means thereby closing said main valve.

2. A pilot for a fluid pressure responsive valve having a pressure responsive main valve, said pilot comprising a casting having first, second and third ports; a first chamber and a second chamber in said casting; said first port communicating with said first chamber, said second port communicating with said second chamber; first passage means between said first chamber and said second chamber; first remotely operable valve means in said casting for selectively opening and closing said first passage means; second passage means between said second chamber and said third port; second remotely operable valve means in said casting for selectively opening and closing the end of said second passage means communicating with said second chamber; third passage means between said first chamber and said second passage means; and pilot valve means for variably restricting the end of said third passage means communicating with said first chamber.

3. The pilot of claim 2 wherein the pilot valve means comprises a valve member associated with said first chamber end of said third passage means and a pressure responsive element connected to actuate said valve member, said pressure responsive element having one side exposed to a control chamber defined in part by said casting.

4. The pilot of claim 3 including a first further port in said casting comprising an outer section having means for attaching a control fluid pressure conduit or for mounting a closure device, and an inner section, and a control bore in said casting connecting said third port with said control chamber through said inner section, and means for mounting a device in said inner section to close said passage means when a control fluid pressure conduit is connected to said outer section.

5. The pilot of claim 4 including a cup-shaped casing member, the rim of said casing member being secured to said casting, the periphery of said pressure responsive element being secured between said rim and said casting, a port in said second casing member including means for removably mounting a closure device or a fluid pressure conduit to said port, an intermediate section in said further port in said casting and a second control bore connecting said intermediate section to said control chamber when a closure device is mounted in said inner section.

6. The pilot of claim 3 including control passage means within the casting connecting said third port with said control chamber, a further port in said casting connected by a passage to said control chamber and having means for attaching a control fluid pressure conduit or for mounting a closure device, and means for removably mounting a device in said control passage means to close said control passage means between said third port and said control chamber when a control fluid pressure conduit is mounted to said further port.

7. The pilot of claim 3 wherein the pilot valve member includes a poppet valve part, a stem part and a guide bushing, said stem part being sealingly slidable in said bushing, said bushing being secured in said casting, said bushing defining at least a part of a wall separating said first chamber from said control chamber.

8. The pilot of claim 2 wherein said second passage means and third passage means comprise a first bore between said first chamber and said second chamber and a second bore between said third port and said first bore, said second passage means including said second bore and a part of said first bore, and said third passage means including another part of said first bore.

9. The pilot of claim 8 including a third bore intersecting said first bore and said second bore, said first bore communicating with said second bore through said third bore and a needle valve adjustably mounted in said third bore for variably restricting communication between said first bore and said second bore.

10. The pilot of claim 8 wherein said first passage means comprises a bore parallel with said first bore, and said first, second and third ports are generally transverse of each of said bores.

11. The pilot of claim 2 wherein the first and second remotely operable valve means are solenoid valves.

12. The pilot of claim 2 wherein said first passage means comprises a bore extending through an external wall of the casting and through an internal wall dividing said first chamber from said second chamber, wherein said first remotely operable valve means comprises a piston part slidable in the bore and extending through said second chamber into said interior wall and when said first remotely operable valve means is in its closed position, and wherein said first remotely operable valve means further comprises a reverse-acting solenoid, said piston part being carried by the solenoid plunger.

13. A pilot for a fluid pressure responsive valve having an expansible control chamber for controlling the position of the valve member, said pilot comprising a casting having first, second and third ports; a first chamber and a second chamber in said casting, said first port communicating with said first chamber and said second port communicating with said second chamber; first linear passage means between said first chamber and said second chamber; second linear passage means between said first passage means and said third port; remotely operable valve means for selectively opening and closing said first passage means between said first chamber and said second passage; and pressure responsive pilot valve means for variably restricting said first passage means between said second chamber and said second passage.

14. The pilot of claim 13 wherein the pilot valve means comprises a valve member and a pressure responsive element connected to actuate said valve member, said pressure responsive element having one side exposed to a control chamber defined in part by said casting.

15. The pilot of claim 13 including a bore intersecting said first passage means and said second passage means, said first passage means communicating with said second passage means through said bore, and adjustable needle valve means mounted in said bore for restricting communication between said first passage means and said second passage means.

* * * * *